(12) United States Patent
Leroy et al.

(10) Patent No.: US 9,172,480 B2
(45) Date of Patent: Oct. 27, 2015

(54) RADIO-FREQUENCY COMMUNICATION CONTROLLED BY A MICROCIRCUIT

(75) Inventors: Pascal Leroy, Chelles (FR); Joseph Leibenguth, Saint Cloud (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 13/504,833

(22) PCT Filed: Oct. 22, 2010

(86) PCT No.: PCT/EP2010/066004
§ 371 (c)(1),
(2), (4) Date: Apr. 27, 2012

(87) PCT Pub. No.: WO2011/051193
PCT Pub. Date: May 5, 2011

(65) Prior Publication Data
US 2012/0222131 A1 Aug. 30, 2012

(30) Foreign Application Priority Data

Oct. 29, 2009 (EP) .................................... 09306034

(51) Int. Cl.
*H04L 29/06* (2006.01)
*G06F 21/00* (2013.01)
*H04H 60/15* (2008.01)
*H04H 60/16* (2008.01)
*G06K 19/07* (2006.01)
(Continued)

(52) U.S. Cl.
CPC ............... *H04H 60/15* (2013.01); *H04H 60/16* (2013.01); *H04H 2201/13* (2013.01); *H04L 29/06* (2013.01); *H04W 12/12* (2013.01)

(58) Field of Classification Search
CPC .. H04L 29/06; H04L 12/12009; H04W 12/12
USPC ................... 726/27; 705/51; 455/456.1, 3.06; 340/7.23; 235/382
See application file for complete search history.

(56) References Cited

U.S. PATENT DOCUMENTS

2007/0021057 A1* 1/2007 Arseneau et al. ............ 455/3.06
2010/0063931 A1* 3/2010 Cole et al. ........................ 705/51
2013/0276140 A1* 10/2013 Coffing et al. ................... 726/27

FOREIGN PATENT DOCUMENTS

EP        1 627 347          2/2006
EP        1627347 A2  *     2/2006
(Continued)

OTHER PUBLICATIONS

Morshed, M.M.; Atkins, A.; Yu, H.; "Efficient mutual authentication protocol for radiofrequency identification systems"; Communications, IET; Year: May 2012, vol. 6, Issue: 16; pp. 2715-2724.*
(Continued)

*Primary Examiner* — Andrew Nalven
*Assistant Examiner* — Courtney Fields
(74) *Attorney, Agent, or Firm* — Buchanan Ingersoll & Rooney PC (57) ABSTRACT

The invention relates to a method for the radio-frequency communication of data, in which the receiving of and/or access to said data is controlled by control means, including an electronic microcircuit, on the basis of access rights. The transmitted data includes time information, and the access rights are controlled on the basis of said time information. The invention also relates to a device for controlling access rights as well as to a radio-frequency receiving device including same.

21 Claims, 2 Drawing Sheets

(51) Int. Cl.
*H04L 9/32* (2006.01)
*H04W 12/12* (2009.01)

(56) References Cited

FOREIGN PATENT DOCUMENTS

| WO | WO 0016570 A1 * | 3/2000 |
| WO | WO 2004/100060 A2 | 11/2004 |
| WO | WO 2004100060 A2 * | 11/2004 |

OTHER PUBLICATIONS

International Search Report (PCT/ISA/210) issued on Jan. 7, 2011, by European Patent Office as the International Searching Authority for International Application No. PCT/EP2010/066004.
Written Opinion (PCT/ISA/237) issued on Jan. 7, 2011, by European Patent Office as the International Searching Authority for International Application No. PCT/EP2010/066004.

* cited by examiner

RADIO-FREQUENCY COMMUNICATION CONTROLLED BY A MICROCIRCUIT

The present invention relates to a method, a system and a device for controlling the radiofrequency receiving of data flows by a microcircuit.

It more particularly relates to radiofrequency receiving devices including means for controlling the receiving by a microcircuit, and more specially a chip card including rights of use. The data flows are broadcast, and preferably radio broadcast, to a set of devices including rights of use.

The application for a patient EP1627347 discloses a chip card-controlled radio. The associated card includes data stored in the chip relating to operational frequencies and times (authorized operation time). The system composed of the reader and the associated card is intended for use upon sports, cultural, religious or other events and for supplying the users with information and entertainment. The radio cannot operate without the chip card which is inserted into the reader and selects the programmed frequencies for a predefined time.

The present system suffers from a certain number of limitations. It can only decrement the operation time. As soon as the chip card is introduced into the device (reader/card radio), the correct frequency is activated and if it is operational, the operation time is decremented. The device makes no difference between the time the card is passively present in the reader and the normal time of utilization of the device during the event.

The device has no value in use adapted to the present needs identified by the inventor as regards communication or connectivity functionalities. More particularly, it cannot automatically select the most appropriate frequency if several frequencies are programmed. On the other hand, the device can decrement rights whereas the receiving conditions are not optimum or if the receiving place or time are inappropriate. The user can then think he/she has not been given the correct service and he/she has been undeservingly debited.

The aim of the invention is to remedy all the above drawbacks. Another aim of the invention is to bring other functionalities or applications corresponding to the users' needs.

The invention more particularly consists in arranging in the chip card and/or the reader receiving means of the RDS type, for receiving data including indicators of duration, time and/or event information and using such information in the device in a more efficient, or fairer or more advised way. Preferably, the device makes it possible to receive complementary information. Such complementary information can be otherwise collected at other times or live and/or through other interfaces.

Using such information can aim at other purposes. More particular it makes it possible to avoid errors in the counting of rights thanks to an internal diagnostic of the listening conditions such as the place, time or the subject of the program.

For this purpose, the invention relates to a data radiofrequency communication method wherein the receiving of and/or access to such data is controlled by control means including an electronic microcircuit on the basis of access rights.

The method is characterized in that the transmitted data includes information relating to time and/or an event, and in that the access rights are controlled on the basis of such time information.

According to other characteristics of the method:
it includes a step of loading complementary information linked with the data to be received;
The loading of the complementary information is executed by a short or medium range interface;
The complementary information includes an indication of localization of a loading place and/or an indication of frequency so as to receive data relating to the place;
The loaded complementary information includes a plan of the place;
The loaded complementary information includes bonus points, gratuities or equivalent and/or opens other access rights;
The control includes the implementation of at least one step or one program of checking the receiving conditions through a test of adequacy between some parameters relating to the data to be received, more particularly the time, the place and the frequency;
The control then triggers a message of error further to the diagnostic making it possible for the user to create optimum receiving conditions. More particularly, the control implements a step of automatic anticipation of the time of the program a user subscribed to in order to inform him/her in advance with an appropriate message or alarm. If need be, when coupled with a GPS system, the device can calculate the route and the time required for attending the event in time; this may require a display in/on the radio reader and may concern tourist guiding applications.
if need be, the device coupled with a GPS system calculates the event location and emits a message of error if the detected place is erroneous with respect to the place of the event or the optimized place for receiving a frequency.

The invention also aims at a device for controlling the data radiofrequency receiving including means for controlling the receiving of and/or the access to such data on the basis of access rights, with said control means including an electronic microcircuit;

The control device is characterized in that the data to be controlled includes time information and/or information relating to an event, and in that said means for controlling the access rights authorize a user's access to the data by referring to such time information.

It also aims at a system or a device for receiving radiofrequency data including the above control device and/or a device able to implement the above-mentioned method.

Other features and advantages of the invention will appear upon reading the following description which is given as a not limiting example, and referring to the appended drawings, wherein.

Figures 1, 2:
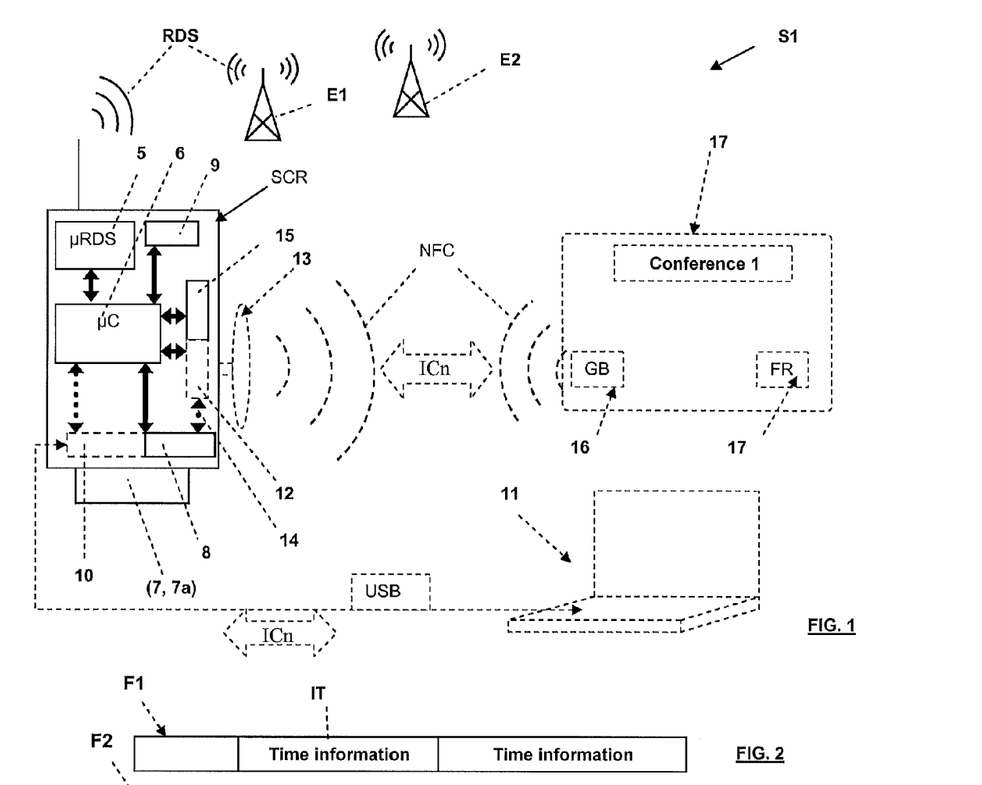
FIG. 1 illustrates a data radiofrequency emitting/receiving system according to a general embodiment of the invention.
FIGS. 2 and 3 illustrate time and event information carried by the data flow emitted by an emitting base unit and intended for the devices according to the invention.

In FIG. 1, the invention provides for a radio broadcasting system S1 including one or several radiofrequency emitter(s) E1, E2, as well as one or several SCR radiofrequency receiver(s). The system is here a system of the RDS type, as more precisely detailed hereinunder. If need be, any radio or television broadcasting system able to carry time or event information to a set of receivers can be efficient for solving the problem met. The system preferably concerns systems for broadcasting data to a set of receivers but can also concern the telephone system for only one subscriber, and more particularly as regards the implementation of step 130bis.

At present, the exemplary device is analogical and the only possible digital data would be on the RDS signal. RDS does not exist in the digital world. Transmitting data of the audio or video types shall be difficult, when using the RDS, since the rate is not high enough.

However, using a digital carrier, as in the Sirius XM Radio digital radio in the USA, could make it possible to additionally carry time or event information, card numbers or subscribers' names to be invalidated so as, more particularly, to cause the end of the service because of the non-payment of the subscription. And, more positively, when the attending to an event and/or an active listening are detected, this could lead to the writing of loyalty points into the card.

Data is emitted by radiofrequency waves and picked up by the receiver according to the invention. Data includes, in the example, any type of audio, video . . . data or data flows. In the example, data more particularly includes a live audio sports program or a conference in several languages.

Each SCR receiver knowingly includes radiofrequency means for receiving data 5, which include in the present example a chip (μRDS) including a RDS functionality and means for controlling the receiving of and/or access rights to such data 6, 7, 7a. Such control means includes, in the example, a chip of an integrated circuit 7 such as a chip of a chip card 7a. Such control means may include a microcontroller (μC, 6), more particularly for managing the interfaces and peripheral units. The μRDS chip can be preferably connected to the microcontroller μC, 6 and/or to the chip of integrated circuit 7. The chip 7 can be located on a removable hand-held support, such as a card, connected with the SCR device or permanently fixed on a PCB of the SCR device.

According to one embodiment, the complete data flow broadcast by the radio channel according to a specific format and protocol can preferably transit from the radio chip to the interface chip.

The radio broadcasting system will emit an analogical or digital audio flow and, if need be, (for an analogical program), use the RDS digital channel for transmitting digital data specific to the event or to the card holder. Such digital data is picked up by the radio chip and transmitted by the radio chip to the chip (of the chip card type) to be interpreted. The chip (chip card type) shall in turn drive the radio chip to the correct receiving frequency and up-date the holder's rights.

The microcontroller 6 (μC) in the example, manages the exchanges between the μRDS chip and the rights controlling chip 7 through adapted interfaces. In the example, the μRDS radio chip is connected, through a series or I2C link, to an interface chip or an integrated circuit chip 7 interface 6 controller. For instance ON and OFF signals, respectively for the sound and the frequency to be selected if ON, i.e. standard exchange signals, are exchanged from the interface 6 chip to the μRDS radio chip.

The chip card 7a (or integrated circuit chip 7) will then consider the data picked up by the RDS chip, and more particularly the frequency, the place, the time, with, possibly other criteria obtained otherwise (localization, identifiers, additional rights won, correct answers to a game . . . ) and decide on the action to be taken, thus executing a complete smart and enhanced control of the RDS radio.

Peripheral units or interfaces of known types as mentioned hereinunder may be provided separately, cumulatively or according to various possible combinations. Thus, the device may include one or several ISO 7816 and/or USB interface(s) with a chip of a chip card, a chip of the NFC type, an audio interface, a micro, a loud-speaker, an audio connector for an audio headphone or an ear-piece, a video screen or display of the touch-type or not, a graphic microcontroller, a keyboard with touch-keys or not, any interface or means of a known type required for providing an interface of the man/machine (IHM) type.

Alternatively, a chip or a card of the PCMCIA or "Express Card" type, USB key or any other card, an object having means for storing, preferably secure access rights can be considered by the invention.

Figure 3:
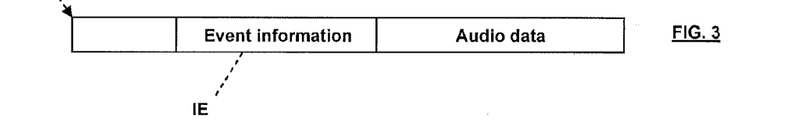

According to one embodiment of the invention, the system S1 provides for one or several emitting means and/or relays E1, E2, adapted for inserting or mixing time information IT and/or information relating to one event IE, into/in the broadcast data flow (F1, F2, in FIGS. 2, 3) or any other information intended to be used/processed by the chip in order, more particularly, to make a diagnostic and take action accordingly, more particularly as regards the counting of rights.

On the other hand, the SCR device provides that the means for controlling the reception, the access rights or the access to such data, as mentioned above, authorize access to and/or receiving of data on the basis of such time information and/or on the basis of the event received. Time information can be, for example, the time, date.

As regards the time information, the invention preferably uses the function CT or the function PS as described hereinunder and specific to the RDS system to transmit information to the receiver thus making it possible, for instance, to set an internal clock. The clock can be that of the SCR reader or, may be that of the control chip inside the chip card.

The refreshing of the clock can be regularly executed by the RDS device, and it will thus be possible for the SCR chip or for the chip of the chip card, to have a more or less accurate clock. Some kind of clock recovery is thus possible by the RDS and the internal clock of the SCR device with the chip (of the chip card) needs not be very accurate.

If need be, data can be broadcast according to various frequencies and a function AF described hereinunder of frequency monitoring can be implemented by the device.

Service Functionalities of the RDS Used Together or not by the Invention, According to One Exemplary Embodiment PS (Program Service): it enables the display of the name of the radio station received on a screen of a device. Such service can be diverted to carry dynamic information:

CT (Clock Time): it enables to transmit time, and thus to set the receiver clock. In principle, the clock is radio-controlled by the DCF77 emitter in Frankfurt (Germany);

AF (Alternative Frequencies): the emitters broadcast the list of frequencies of the emitters in the vicinity of the same station. Car radios can thus search for the best frequency available, at any time. This is the reason why the same station can be listened to from one end of the country to the other without manually changing the frequency (frequencies are "downloaded" into the radio car random access memory);

RT (Radio Text): this service makes it possible to broadcast texts through the RDS. The texts mentioned can then be displayed upon request on the receivers' screens;

PI (Program Identification): the PI code is a unique code assigned to each radio, which makes it possible to definitely identify it;

In other utilizations, the RDS system can transmit other types of information such as service data belonging to each radio, or even pictures.

According to a possible implementation, an adapted flow of digital data is picked up by the RDS functionality of the µRDS radio chip 5. The radio chip 5 then communicates with the microcontroller 6 such data which is at least partially relayed to the chip 7 of the chip card, with the microcontroller being used as an interface chip with the so-called control or security chip 7. The microcontroller communicates with the chip 7 via a physical and/or logical interface 8 of the ISO 7816 type. At least the data useful for the chip 7 in order to carry out the control is relayed to the chip 7. Therefore, useful information can be retrieved by the microcontroller 6 and transmitted to the chip 7 whereas the data relative to the audio/video program is for instance stored in the buffer memory, for the time required for the processing by the chip 7.

If need be, the broadcast program is partial, with the card including a complementary part. In order to be understood by the user or to be complete, the device uses the complementary part of the program pre-stored in the chip or in the bump when the user listens to it or accesses it, for instance, the sound track of a video program. Such provision makes it possible to have a pseudo-encrypted broadcast: for instance, with a random jump to a different frequency on a time basis; the RDS system makes the jump known at T0+x seconds in order to make it possible to automatically change the frequency at the right time.

The integrated circuit chip 7 includes control means able to carry out a subsequent checking and/or management of rights (Da). For instance, the chip conventionally includes a microcontroller and volatile and non volatile memories. The rights can be of different natures. In the example, they more particularly make it possible to access a stadium, to listen to some content on a specific frequency, to check the validity of the card, to select the most appropriate frequency, etc.). The rights Da can be units in a counter or an equivalent.

Figure 6:
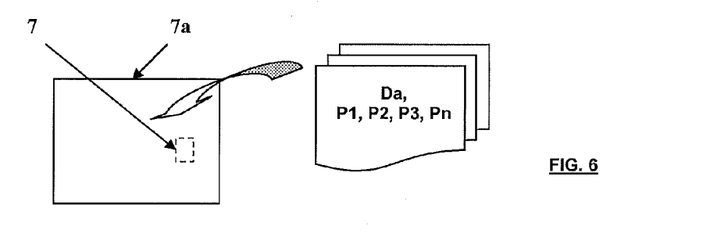
FIG. 6 illustrates the loading of applications into the microcircuit 7 of a chip card 7a, and more particularly test or diagnostic P3 or access right Da applications.

The control chip 7 also includes testing means (P1, P2, P3, . . . , Pn) which also make it possible to avoid counting units of the chip card if no frequency is available or if the reader is not used in the appropriate zone or if the reader and the card are not used for the events and/or in the corresponding time interval and/or schedule.

Corresponding tables stored in the chip and indications supplied by the device enable the chip to trigger, or not, an authorization signal. Rights or rating tables, according to the time, can be provided for. Signals of absence of available frequency can be transmitted by the µRDS chip to the microcontroller 6 and then to the control chip. This makes it possible to avoid counting, for instance if the selected frequency is not available or is of bad quality.

Similarly, the control chip may deduce an erroneous localization so as not to count units. For instance, the device picks up several frequencies but the conference room is not the correct one. Localization information can be picked up more particularly by the control chip through the interaction with a local emitter, for instance a tag (an electronic tag), a contactless base unit, a reader positioned in a place intended for receiving. The control chip executes a test or gives a diagnostic, for instance, in order to check that all the unit counting conditions are met and gives the authorization and/or executes the counting.

For this purpose, the chip 7 may include, in an EEPROM or flash memory, at least one adapted test program P1, Pn which is executed by the chip 6 microcontroller in due time.

The chip 7 can include means Pn enabling an audience monitoring (loyalty), an aggregation of the data and, if need be, a potential utilization of the data when the chip card and/or the device is connected to an external server or reader. As a matter of fact, the chip stores utilization histories (or traces) which are wholly or partly established during such connections with an external reader or server linked to a history utilization center.

The device can also include means enabling traceability, a geo-localization or at least a checking, through the chip card, of an attendance or absence to a specific event such as games or loyalty programs.

Then, for instance, the card includes means for storing data relating to listening times and/or used frequencies, and/or actuation places. Then, for instance, a localization is stored in the chip 7, more particularly through the interaction with a local base unit including a localization trace (identifier and/or location name). Such trace can be communicated to the device by a local contactless base unit and transmitted to the chip 7 to be stored in an audience place memory with, possibly, the corresponding time and date.

Reversely, such tracks or data can be collected more particularly by means of an interaction with any reader networked or not with a data management server. For instance, the interaction with a base unit in a listening place samples an identifier of the device which is then sent to a management center or server for analysis purposes. If need be, the device includes a GSM, GPRS modem function and data is directly uploaded by the device to a statement or history management central server.

Alternatively, the chip card 7 plays the part of a SIM card or an annex card and can also be moved to a portable telephone, for instance, or any other reader and the statements can be obtained then though an interaction or a connection with a server via the mobile telecommunication network.

Thus, with the means described here-above, and more particularly the new functionalities of the chip card and of the device, the invention deals with the above mentioned problems. It should also be understood that through a crafty combination of a RDS function in the device, the invention makes it possible to broadcast information based on some events, such as the name of the event, the date and time of the event, the actual date and time, mentioned in a non limitative way.

The radio chip then communicates such data to the chip of the chip card, thus supplying the chip card with all the relevant information for controlling the rights and the listening time. If need be, the controller 6 itself provides for or integrates the chip 7 function, or reversely.

Nowadays, in an example, a radio chip is used which is controlled by a chip of a chip card, through an interface chip which can make ISO communications. The card is still the slave of a microcontroller which is the SCR device arbitrator for all the functions: control of the radio chip, of the RDS chip, of the USB, of the IHMs (display, buttons, keyboards . . . ).

Additional Hardware and/or Software Architecture:

The invention may preferably include a dual interface functionality. It can be provided, in a known way, either by a dual interface chip card (with the antenna being provided in the card), or by an integrated microcircuit with a dual ISO/RF interface placed in the card and connected to a RF antenna 13 included in the device or connected thereto, more particularly via contacts C4, C8 (not shown) of a terminal block of ISO 7816 standard chip card electric contact pads, connected to a corresponding connector in the device.

The functionalities of the dual interface basically make it possible to carry out a standard access control and contactless payments, like any other dual interface chip card. Advantageously, such a function also enables a geo-localization during an exchange with a reader or a base unit, the position of which is known.

The localization can be communicated by the reader to the device via the contactless interface. On the contrary, the reader may collect an identifier of the device and/or the contactless chip card. Such an identifier can be subsequently communicated to a central server for following a route, or for statistics. As a matter of fact, for a treasure hunt, for instance, the user will be requested to place his/her badge on the contactless reader by using either the chip card, or the SCR device; a double traceability can result therefrom; the one stored in the card and the one stored in the central server.

The base unit communicates (more particularly through a contactless communication), a location information or an information enabling the device to be located. For instance, the matching is obtained by searching an entry in a data table, outputting a localization, using a matching list or base stored in the internal memory. A matching appropriate frequency can subsequently be automatically triggered or selected by the device, from the detected localization.

Alternatively, the device may include means for selecting or entering a location, a code representing a localization (a keyboard, any IHM) which can be directly used by the user or any other authorized person.

In addition, the geo-localization may enable an automatic triggering of the correct frequency for listening to a program, following a game, apprehending a point of purchase advertising or broadcasting an advertisement at the correct place or checking a user's route. This may be of particular interest in a museum, during a treasure hunt (treasure hunt or orienteering race) and during a convention during which events or conferences in various foreign languages occur in various places (with the radio being useful for the translations).

The device may include a USB connector 10, preferably of the B type. The connector may be connected with the ISO 7816 contacts of the chip card via an active USB/ISO interface or directly with the C6 & C8 pads of a USB card, of the e-Gate type. Thus the SCR device becomes a true chip card reader which can be connected to any USB master peripheral unit. This enables the user to connect his/her card associated with the reader to the computer and to the Internet and, in particularly to download information, user's rights or subscriptions. The device may provide for means for selecting the exchanges between a computer 11, the chip 7 and the microcontroller 6.

Alternatively, the device may include a mobile telephone module for a direct connection with the Internet. If need be, the chip may include a subscription to the telecommunication network.

The SCR device may include a NFC interface or functionality (12, with an antenna 13) in order to make it possible not only to emulate a contactless chip card, but also to be considered as a contactless reader. The NFC reader makes it possible to read any radiofrequency tag or any radiofrequency transponder positioned, in particular, on posters or admission tickets or brochures, some rights or units can be transferred into the chip of the chip card and thus take advantage of promotion activity, etc.

The NFC function enables exchanges between two SCR readers provided with man/machine interfacing means. The NFC functionality can also improve game sessions, as for the dual interface function. The NFC chip may reside in the chip card module (hybrid module) and be supplied by batteries, or a battery. Alternatively, the NFC chip can be accommodated in the SCR reader and addressed by the chip card via a SWP connection. The antenna can be positioned either in the chip card or in the SCR reader.

If need be, the device may include a Bluetooth interface 15 which makes it possible to provide function like a NFC interface (localization, collection of information . . . ) or to communicate with the computer 11.

Figure 4:
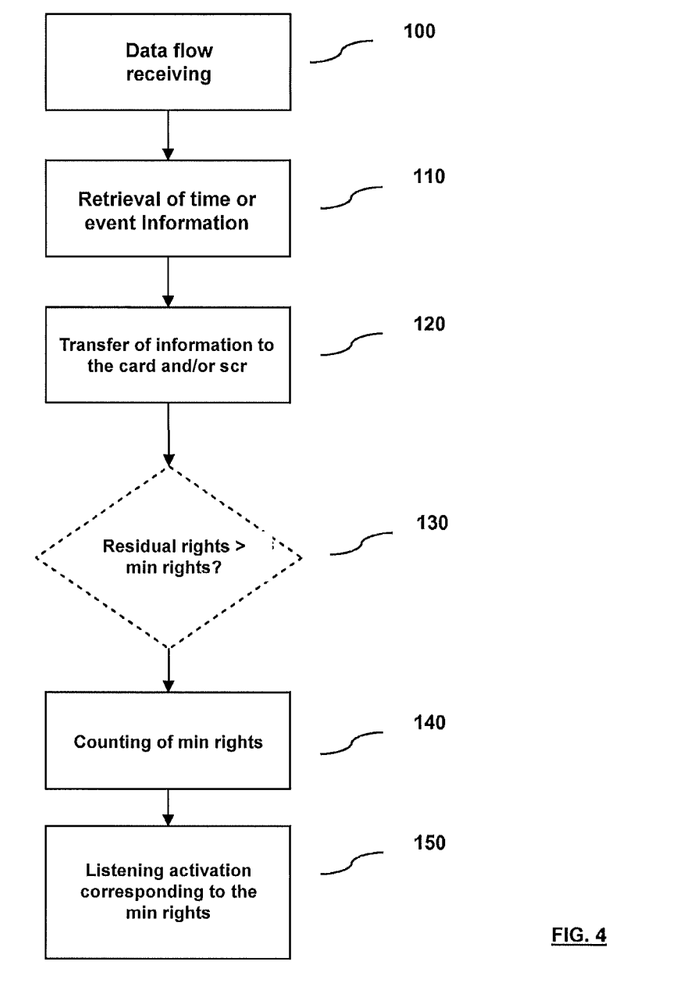
FIG. 4 illustrates steps of a data radiofrequency receiving method according to one embodiment of the invention.

The method is now described while referring to FIG. 4 showing the steps of an exemplary implementation and means of the device illustrated in FIG. 1.

At step 100, the method includes a step of receiving data and controlling the receiving of data and/or accessing such data in order to enable or authorize a holder of the device, to access such broadcast data. In the preferred example, the step 100 is executed using means for controlling rights of access to such data, as explained above. Such means include, for example, an integrated circuit chip 7. The chip 7 can be directly accommodated in the radio receiver or contained in the associated chip card or module connected to the receiver.

According to one characteristic of the invention, the data received includes time information and/or information relative to one event which is used for managing access rights control. More preciely, the control is carried out on the basis of such information.

In the example, the time information is information including the sharp local time which is transmitted by the radio broadcast data thanks to the RDS system. FIG. 2 illustrates a data field provided for containing time information IT among a data flow emitted and then received.

At step 110, information is retrieved from the data flow by the µRDS receiving means and then communicated to a microcontroller 6 in the chip 7, for updating the duration counting means, more particularly a duration counter associated with an internal or an external clock. If need be, pulses are emitted by the ARDS receiver toward the chip or from an emitter E1 to the chip 7, through the receiver; then units are counted in the chip, upon each pulse or period. This may be simple means for counting units or the time remaining.

The card contains, for example, a subscription corresponding to a determined number of hours of authorized reception. Time information or duration is transmitted to the card at step 110, for counting purposes on the basis of such a piece of information, at step 140, instead of activating an internal counter of the card upon switching on, in the receiver (or reader), as in the state of the art. If, for instance, a program is broadcast from 6:00 to 7:00 P.M., the internal clock or a counter in the card is updated, specifically before or during the program. Access rights corresponding to a listening hour shall then be debited accurately from a duration credit.

Alternatively, the invention can provide for the counting of the ON time, only during a time interval corresponding to a broadcasting period. Alternatively too, a piece of information IT indicating the starting time and the ending time can be transmitted to the card which counts the time, by difference.

Two separate applications are imagined: the "pay per use" system wherein the user may consummate as he/she wants up to a limit of a prepaid package and a yearly subscription wherein he/she can consummate as much as he/she wants to, but for a given season, or a given period of time.

According to another embodiment, information may correspond to an event IE (FIG. 3); it may be any signal representing the beginning of a program (a beep, a code). Information IE may be transmitted repeatedly or periodically to tell the card what must be counted on the basis of such events. The event can represent a time beep or the name of a program connected to any event in sports, theater, concert, the name of the event, etc.

A user's subscription or rights can consist in a credit for a certain number of events, whatever they are.

Alternatively, receiving an event may trigger a clock and the associated counter in the chip 7, more particularly within the time of the program. Thus, at the end of the program, leaving the card in the reader does not decrement the credit owned by the holder.

If need be, the method of the example may include a step 130 of test P1 consisting in checking that the remaining rights are above a minimum right. For example, the test checks that 5 min remain, a listening time or the duration of the program in order to count by anticipation the corresponding right, if need be. The right can also be counted only when the receiving of data is completed.

Figure 5:
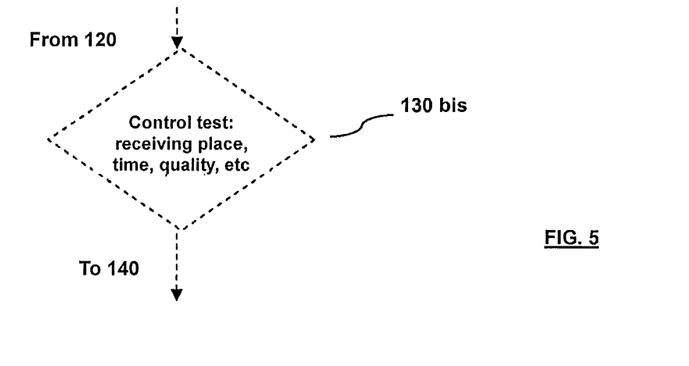
FIG. 5 illustrates a step 130*bis* which is an alternative or an addition to step 130, relative to the preceding Figure, of another embodiment of the invention.

Alternatively, at step 130bis, the chip executes a test or a diagnostic as per a program P3, making it possible to select or authorize or check the correct progress of a receiving operation. As mentioned above, the card makes it possible to avoid handling errors, an error in the space where the holder stands, an error of compatibility of parameters together between the place and/or the frequency and/or the time and/or the event required for a correct receiving of a program.

In one example, the chip makes a comparison with information for selecting a frequency loaded from a base unit, then localization information transmitted from another local tag, and more particularly in a listening or projection, or conference room, then the checking of the receiving time and the progress of the event. The counting is performed if the receiving occurs at the right time or time interval and in the correct room. Thus the device receives several parameters like a time information via a RDS channel, then location information via an NFC or Bluetooth channel or another one, then if need be, information relating to the name of the event. If the three pieces of information are in adequacy further to one or several tests of the program P3, then counting may be carried out. A step of P3 test can consist in comparing the three parameters with respect to rights data relative to the event stored in the memory. For example, the rights may include 10 listening hours in order to attend 15 conferences in 5 predetermined room numbers.

Thus the invention makes it possible to protect the user against a non desired counting or an undeserved counting. It provides for a guarantee for the user against an error, an omission, an incorrect utilization of the device.

This is mainly aimed at preventing leaving the card in the reader at the end of the event and thus to have one's units counted and the SCR device batteries unloaded. This also prevents the user's children from discharging the SCR or use units, when playing therewith.

An ON/OFF switch can prevent an unwanted consumption situation (units and batteries) if the card remains inserted. On the contrary, the guarantee is more particularly activated when the signal received does not correspond with the event aimed at. A sponsor of the event can then be listened to "free", out of the event time, but the units shall be counted during the event. Similarly, the listening period may be plain, then encoded.

Upon completion of the RDS emission, one piece of information IE of the transmission completion may be transmitted to the device to be interpreted by the card as information intended to de-activate loudspeakers, and/or stop the counting. Alternatively, the card counts the duration and transmits a deactivation control to the microcontroller 6 at the end of the time.

At step 150, the method includes an actuation/authorization to listen (or other access to data). In one example, the card can transmit an actuation signal more particularly to the device controller, or even the RDS chip to actuate the loudspeakers (or even a visual interface of the device with the user).

On the other hand, according to an advantageous characteristic, the method can include a step of downloading complementary information (ICn) relating to the data to be received. Information may, for instance, include an indication of frequency for receiving data, a set of complementary data for the data to be received (route, plan, rules of a game, bonuses, questions, sub-routine, code part, soundtrack, color code, etc.).

The application provided in the invention consists in having information, which is downloaded into a chip card or downloaded via an external base unit, read on an electronic tag or supplied by an external reader or base unit. Information can be transmitted by a mobile telephone, more particularly through NFC, Bluetooth, via means 13 or 15.

Information can be made available as a bar code or an equivalent, and read by an appropriate optical system.

The loading of information is preferably executed using a short or medium range interface, for example, of the NFC or Bluetooth type, etc. . . . For this purpose, the radio receiver includes a corresponding additional software or hardware interface or corresponding communication means.

In the example, in a museum, the user places his/her device close to a radiofrequency emitting means according to the ISO 14443 or 15 . . . , standards of information emitting point 17 (Conference 1) including for example a poster, a panel, or an equivalent, provided with one or several tag(s) 16, 17, each one corresponding to a language (GB, FR) and a receiving frequency.

Here, information is a frequency (or a code relative to a frequency) in order to listen to a conference 1 in English (GB), downloaded by the device and used to set the radio thereon, in order to receive comments relating to the place associated with the information. The complementary information can also be a deciphering key making it possible to decipher the received data. This preferably concerns data broadcast digitally (mTV equivalent) with a chip card used as a decoder with a digital radio.

On the other hand, the received data, of the key type, could be used during a connection to an Internet site, for example, in order to unlock secured accesses which can only be accessed by the persons attending the event. (For example, access to pictures taken during the event and which are encrypted or altered by a marking). The complementary information can transit through the chip or not. The chip may integrate the complementary information (ICn) in a test or a diagnostic (Pn) if need be with other control parameters, in order to grant or not access to received data or select an appropriate program or frequency.

In a conference application, tags are associated with various languages, and the user places his/her reader close to the tag corresponding to the translation into the language he/she wishes to hear and a frequency is downloaded into the radio receiver and/or a chip card. The downloaded frequency is used for setting the radio so as to receive the correct translation. Alternatively, the invention provides for a direct change of the program content, more particularly in the chip 7 or the storing means (mass storage card SD, flash . . . ) controlled by the chip 7, instead of downloading a frequency. The downloading may be local, on the spot or differed, more particularly on the Internet or via any base unit.

According to a characteristic or an application of the invention, the additional information may include a localizing indication of a downloading place (IC1) and an indication of a frequency (IC2), so as to receive data relative to the place.

The downloaded information may include a plan of the place. Thus, in the example, a user receives the plan of a fair or a show, a town, a supermarket, a shopping mall and a localization of data downloading points in the place. The example here preferably aims at a digital SCR receiving device with IHM and display means.

The user may locate the downloading points on the plan and go to such points in order to download complementary information, more particularly a frequency or means (key, code, . . . ) via, for example, an NFC communication. Such collected data may in turn make it possible to access a program.

The application provided by the invention more particularly consists in a treasure hunt or a route to be followed by a user for visiting stands in a show or a fair, a path marked with arrows, a rally, etc. . . . At each indicated point, the user downloads other data and/or receives a range frequency limited to such place. The downloaded data can be images and data received through the radio, comments on the pictures, downloaded images. Preferably, the example here aims at a digital SCR receiving device with IHM and display means.

According to another application, a user searches a point in a shopping mall: at the mall entrance, a base unit downloads a plan of the shopping mall or a plan of the departments and the products for sale, as well as a list.

When selecting the reference of the product searched in the list (or typing the reference thereof on a keyboard), the receiver can show the localization of the product on the plan as well as the path from where the user stands.

If need be, a local radio control system detects the position and direction of the receiver (more particularly using an emitter included in the radio receiver) and an audio or video guided path is established up to the product. The local radio control system guides the user more particularly like a GPS. One or several radio emitter(s) is/are used for locating the user, more particularly using a triangulation. The example preferably aims at a digital SCR receiving device with IHM and display means.

According to another characteristic or application of the invention, the downloaded information can include bonus points, gratuities or equivalents and/or open other access rights. In the example, a user goes to various places according to a predefined route: the route may for instance include information on such new products or services, to be introduced to a user.

In order to incite people to go to these various places, an electronic tag, or a base unit is provided in every location. Then the base unit downloads complementary information (ICn), more particularly bonuses and/or a localizing indication of the following base unit. Such base unit can more particularly emit rights giving access to a radio frequency, making it possible to receive other essential information. At least one software application among P1, P2 or P3, is provided for in the microcircuit 7 and can thus concern a treasure hunt or an advertisement route, and more particularly visits of show apartments, etc.

As regards the downloading of complementary information (ICn), the invention can provide for any communication interface and more particularly a USB interface or connector. The connector more particularly makes it possible for the user to download, more specifically, from the Internet, or commercial Web site additional data (ICn), access rights, software, deciphering keys, etc.

The USB connector also makes it possible to read a chip of a chip card included in the radio receiver. It more particularly makes it possible to download rights through the Internet, such as a subscription or reload points into the card or into a safety chip storing such rights.

In one application, the device of the invention includes a radio modem and an interface, more particularly of the USB or "PCMCIA, Express Card" types, with a display or a screen or an audio and/or video system.

Thus, thanks to the invention, rights are more securely counted, without any risk for the user to be debited more than required.

In an ultimate embodiment, all or part of the functions of the SCR device, and more particularly the RDS reception or RF, NFC or Bluetooth interface functions are integrated in the chip card 7a or an equivalent.

The invention claimed is:

1. A data radiofrequency communication method comprising:
   receiving, at a radio frequency receiver, management access rights information, emitted from a radiofrequency emitter, said received management access rights information including at least one of time information and event information; and
   controlling, by a control means including an electronic microcircuit, user access to received data on a basis of access rights, which access rights are controlled on the basis of said received management access rights information,
   wherein said controlling of said access rights includes:
      tracking a user's access to said received data by updating access rights units in a duration counter, in accordance with at least one of said time information and event information included in said received management access rights information, and
      counting units in the updated duration counter in accordance with pulses received by said radiofrequency receiver, and
   wherein said user access to said received data is controlled on the basis of said access rights units in said duration counter.

2. A method according to claim 1, further including a step of loading complementary information linked with data to be received.

3. A method according to claim 2, wherein the loading of the complementary information is executed by a short or medium range interface.

4. A method according to claim 2, wherein the complementary information includes an indication of the data receiving frequency.

5. A method according to claim 4, wherein the complementary information includes a localizing indication of a loading place and/or an indication of frequency so as to receive data relating to the place.

6. A method according to claim 5, wherein the loaded complementary information includes a plan of the place.

7. A method according to claim 2, wherein the loaded complementary information includes bonus points, gratuities or equivalent and/or opens other access rights.

8. A method according to claim 6, wherein the loading of the complementary information is executed by a USB interface.

9. A method according to claim 1, further including, prior to updating access rights units in said duration counter, the implementation of at least one step or one program for checking the receiving conditions through an adequacy test between some parameters relating to the received data.

10. A device for controlling the radiofrequency receiving of data, said device comprising:
    means for receiving management access rights information from a radiofrequency emitter, said received management access rights information including at least one of time information and event information;

means for controlling the access to received data on a basis of access rights, which access rights are controlled on the basis of said received access rights management information; and means for tracking a user's access to said received data by updating access rights units in a duration counter in accordance with at least one of said time information and event information included in said received management access rights information, and counting access rights units in the updated duration counter in accordance with pulses received by said radiofrequency receiver, wherein said user access to said received data is controlled on the basis of the access rights units in said duration counter.

11. A radiofrequency data receiving device including the control device according to claim 10.

12. The method according to claim 3, wherein the loaded complementary information includes bonus points, gratuities or equivalent and/or opens other access rights.

13. The method according to claim 4, wherein the loaded complementary information includes bonus points, gratuities or equivalent and/or opens other access rights.

14. The method according to claim 5, wherein the loaded complementary information includes bonus points, gratuities or equivalent and/or opens other access rights.

15. The method according to claim 6, wherein the loaded complementary information includes bonus points, gratuities or equivalent and/or opens other access rights.

16. The method according to claim 2, wherein the control includes, prior to updating said access rights units in said duration counter, the implementation of at least one step or one program for checking the receiving conditions through an adequacy test between some parameters relating to the data to be received, more particularly the time, the place and the frequency.

17. The method according to claim 3, wherein the control includes, prior to updating said access rights units in said duration counter, the implementation of at least one step or one program for checking the receiving conditions through an adequacy test between parameters relating to the data to be received, more particularly the time, the place and the frequency.

18. The method according to claim 4, wherein the control includes, prior to updating said access rights units in said duration counter, the implementation of at least one step or one program for checking the receiving conditions through an adequacy test between parameters relating to the data to be received, more particularly the time, the place and the frequency.

19. The method according to claim 5, wherein the control includes, prior to updating said access rights units in said duration counter, the implementation of at least one step or one program for checking the receiving conditions through an adequacy test between parameters relating to the data to be received, more particularly the time, the place and the frequency.

20. The method according to claim 9, wherein said parameters comprise time, place and frequency of the received data.

21. A radio frequency data communication method, in which reception and/or access to data, by a receiving device, is (i) controlled by a control means of the receiving device including a microcircuit and (ii) based on management access rights information, the method comprising:

receiving, by the radio frequency receiver, the management access rights information, emitted from a radio frequency emitter;

prior to counting access rights units in a duration counter, implementing, by the control means of the receiving device, at least one step or program for verifying reception conditions through an adequacy test based on parameters included in the received management access rights information related to data to be received; and when the adequacy test implemented by the control means of the receiving device determines that the reception conditions are adequate, counting access rights units in the duration counter.

* * * * *